US012629899B2

(12) United States Patent
Chowdhury et al.

(10) Patent No.: US 12,629,899 B2
(45) Date of Patent: May 19, 2026

(54) ELECTROSTATIC TACKING MEMBRANE ASSEMBLY

(71) Applicant: The Boeing Company, Arlington, VA (US)

(72) Inventors: Nayeem Chowdhury, Melbourne (AU); Kursat Sezai, Moonee Ponds (AU); William Ko, Melbourne (AU); Nicolette Gan Jia Gui, Melbourne (AU); Scott Backhous, Melbourne (AU)

(73) Assignee: The Boeing Company, Arlington, VA (US)

( * ) Notice: Subject to any disclaimer, the term of this patent is extended or adjusted under 35 U.S.C. 154(b) by 130 days.

(21) Appl. No.: 18/489,370

(22) Filed: Oct. 18, 2023

(65) Prior Publication Data

US 2025/0128477 A1 Apr. 24, 2025

(51) Int. Cl.
*H02N 13/00* (2006.01)
*B29C 65/78* (2006.01)

(52) U.S. Cl.
CPC ......... *B29C 65/7852* (2013.01); *H02N 13/00* (2013.01)

(58) Field of Classification Search
CPC ............... H01L 21/683; H01L 21/6833; H01L 21/6732; H02N 13/00; B29C 65/7852; B29C 65/78
USPC ........................................................ 361/234
See application file for complete search history.

(56) References Cited

U.S. PATENT DOCUMENTS

| | | | |
|---|---|---|---|
| 4,976,012 A | 12/1990 | McConnell | |
| 5,151,277 A | 9/1992 | Bernardon et al. | |
| 5,691,876 A | * 11/1997 | Chen ................... | H01L 21/6833 361/234 |
| 6,053,026 A | 4/2000 | Nardiello et al. | |
| 6,830,712 B1 | 12/2004 | Roffman et al. | |
| 9,561,602 B2 | 2/2017 | Jones et al. | |
| 9,969,131 B2 | 5/2018 | Samak Sangari et al. | |
| 10,538,451 B2 | 1/2020 | Angel et al. | |

(Continued)

FOREIGN PATENT DOCUMENTS

| | | |
|---|---|---|
| EP | 2911833 B1 | 2/2018 |
| EP | 3670160 B1 | 8/2023 |

(Continued)

OTHER PUBLICATIONS

Adapa A/S, Adaptive Moulds, "Double Curved Adaptive Moulds", User Manual, May 2021, pp. 1-24, Denmark.

(Continued)

*Primary Examiner* — Danny Nguyen
(74) *Attorney, Agent, or Firm* — Walters & Wasylyna LLC

(57) ABSTRACT

An electrostatic tacking membrane assembly includes a membrane made of an elastic material, a plurality of electrostatic pads disposed on the membrane, one or more tacking elements disposed on the membrane, and a plurality of electrical leads disposed within or on the membrane and connected with the electrostatic pads and the one or more tacking elements. The electrostatic tacking membrane assembly may be positioned with the tacking elements disposed near or in contact with an overlapped or abutted area of two or more layers of material, and the tacking elements may be electrified and heated so as to bond together the two or more layers proximate the overlapped or abutted area.

30 Claims, 12 Drawing Sheets

(56) References Cited

U.S. PATENT DOCUMENTS

| | | | |
|---|---|---|---|
| 11,114,327 | B2 * | 9/2021 | Boyd, Jr. .......... H01L 21/67253 |
| 2003/0205334 | A1 | 11/2003 | Sherrill et al. |
| 2008/0251975 | A1 | 10/2008 | Gallagher et al. |
| 2010/0043511 | A1 | 2/2010 | Forsyth |
| 2012/0134065 | A1 * | 5/2012 | Furuya ................ H01L 21/6833 |
| | | | 361/234 |
| 2012/0330453 | A1 | 12/2012 | Samak et al. |
| 2014/0169924 | A1 * | 6/2014 | Golda .................... H10H 20/80 |
| | | | 414/800 |
| 2015/0314583 | A1 | 11/2015 | Jess et al. |
| 2019/0184693 | A1 | 6/2019 | Johnson et al. |
| 2020/0331214 | A1 | 10/2020 | Vlavianos et al. |
| 2020/0398459 | A1 | 12/2020 | Lehmann Madsen et al. |
| 2023/0286229 | A1 | 9/2023 | Chowdhury |
| 2023/0330950 | A1 | 10/2023 | Chowdhury |
| 2024/0123631 | A1 | 4/2024 | Crothers et al. |

FOREIGN PATENT DOCUMENTS

| | | | |
|---|---|---|---|
| GB | 2467784 | A | 8/2010 |
| JP | S58100696 | A | 6/1983 |
| WO | 2020178387 | A1 | 9/2020 |

OTHER PUBLICATIONS

Terekhov, I.V. et al., "Binders Used for Manufacturing of Composite Materials by Liquid Composite Molding", Polymers Journal, 2022, pp. 1-30, vol. 14, No. 87, MDPI, Switzerland.

Innovative Sensor Technology AG, "Micro Heaters", Switzerland, retrieved from https://www.ist-ag.com/en/micro-heaters.

Intellectual Property Office of the United Kingdom Combined Search and Examination Report, dated Aug. 7, 2023, regarding Application No. GB2302685.2, 8 pages.

European Patent Office, Extended European Search Report, App. No. 25182430.6 (Oct. 27, 2025).

* cited by examiner

ELECTROSTATIC TACKING MEMBRANE ASSEMBLY

INTRODUCTION

This disclosure relates to electrostatic tacking membrane assemblies.

In certain manufacturing or fabrication environments, dry carbon fiber sheets may be used to fabricate parts, such as in resin infusion processes. These carbon sheets may be picked up from a material supply stack or station and moved to another station, such as a trimming station, an infusion station or the like.

Various approaches may be used to move these carbon sheets from one station to another. One such approach is to use an electrostatic pad, or an array of such pads, carried on the end of an end effector. A voltage may be applied across the pads to create an electrostatic adhesion potential across the pads, and the pads may then be moved to a position near or in contact with a carbon sheet. With the pads positioned near or in contact with the sheet, the electrostatic adhesion potential may be used to attract and electrostatically adhere the sheet to the pads, and then the end effector may move the pads and the electrostatically adhered carbon sheet to another station, whereupon the voltage may be discontinued in order to release the carbon sheet.

This process may be repeated for picking up, moving and positioning other carbon sheets, which can be useful in two-dimensional (2D) and three-dimensional (3D) pick-and-place operations. However, conventional approaches and electrostatic pad designs used in this process face various limitations.

SUMMARY

According to one embodiment, an electrostatic tacking membrane assembly includes: (i) a membrane made of an elastic material and having opposed top and bottom sides with one or more membrane electrical connectors disposed on the membrane; (ii) a plurality of electrostatic pads each having respective opposed first and second sides, wherein each of the electrostatic pads includes one or more respective pad electrical connectors disposed on or adjacent the respective second side for supplying electrical power to the respective first side; (iii) one or more tacking elements disposed on the bottom side of the membrane, wherein each of the one or more tacking elements is configured to be electrically heated; and (iv) a plurality of first and second electrical leads disposed within or on the top side of the membrane and connected with the one or more membrane electrical connectors and the one or more tacking elements, respectively.

The material may have a fiber core covered by at least one veil, wherein the fiber core is made of at least one of carbon, polymer, glass, metal and ceramic, and wherein the at least one veil is made of a thermoplastic material or a thermoset material. Additionally, the electrostatic pads may form a repeating geometric pattern on the bottom side of the membrane.

The membrane may include a plurality of thick and thin regions presented on the bottom side of the membrane, wherein the thin regions are arranged in a hub-and-spoke pattern of spokes radiating from a hub region thereby defining the thick regions. Each of the one or more membrane electrical connectors may be disposed on or within a respective one of the thick regions. The supplying electrical power to the respective first side may be effective for generating an electrostatic potential thereacross. Each of the electrostatic pads may be disposed on a respective one of the thick regions on the bottom side of the membrane with the respective second side of the electrostatic pad attached to the bottom side of the membrane and with the one or more respective pad electrical connectors in communication with the one or more respective membrane electrical connectors.

The electrostatic pads may be spaced approximately 10 millimeters apart from each other, and each of the one or more pad electrical connectors may include a respective ribbon cable extending from or adjacent the respective second side of the respective electrostatic pad. The membrane may be bendable along one or more of the spokes so as to make the electrostatic tacking membrane assembly generally conformable with non-planar surfaces.

The electrostatic pads may have a generally trunco-triangular shape, and the repeating geometric pattern may include one or more hexagonal patterns that are overlapped or abutted with each other. Alternatively, the electrostatic pads may have a generally trunco-rectangular shape, and the repeating geometric pattern may include one or more rectangular patterns that are overlapped or abutted with each other. The hub-and-spoke pattern may include a plurality of hub-and-spoke patterns that are overlapped or abutted with each other.

The tacking elements may be attached to the membrane on one or both of the top and bottom sides of the membrane, and each of the one or more tacking elements may include a respective micro-heater. Each of the one or more tacking elements may further include a respective extending member configured to extend the respective micro-heater outward from the bottom side of the membrane.

Each of the thick regions may include one or more recessed pockets formed therein on the bottom side of the membrane, wherein each of the recessed pockets is configured for receiving a respective one of the pad electrical connectors therein.

The membrane may include a first membrane and a second membrane sandwiched and connected together, wherein the bottom side of the membrane is a bottom face of the first membrane and the top side of the membrane is a top face of the second membrane. In this arrangement, the plurality of thick and thin regions may be formed as part of the first membrane.

The electrostatic tacking membrane assembly may further include a plurality of inserts embedded or attached on the top side of the membrane, wherein each of the inserts is configured for fastenable engagement with an end effector. Optionally, some or all of the inserts may be threaded.

According to another embodiment, a method for tacking together two or more layers of material includes positioning an electrostatic tacking membrane assembly having one or more tacking elements carried thereon such that the one or more tacking elements are positioned near or in contact with an overlapped or abutted area of the two or more layers, and providing electrical power to the one or more tacking elements so as to electrically heat the selected tacking elements, thereby bonding together the two or more layers of material proximate the overlapped or abutted area.

The method further includes supplying electrical power to one or more electrostatic pads carried on the electrostatic tacking membrane assembly (thereby generating an electrostatic potential across the one or more electrostatic pads), moving the electrostatic tacking membrane assembly proximate or into contact with a first layer of the two or more layers of material, thereby creating an electrostatic adhesion between the one or more electrostatic pads and the first layer, and lifting the electrostatic tacking membrane assembly with the first layer electrostatically adhered thereto.

In the moving step, respective first sides of the one or more electrostatic pads may be placed proximate or in contact with the first layer.

The method may also include actuating the one or more tacking elements so as to dispose the one or more tacking elements into contact with the overlapped or abutted area. The method may further include: discontinuing the providing of electrical power to the one or more tacking elements; and repeating the supplying, moving, lifting, placing, providing and discontinuing steps for one or more additional layers of material. Each of the two or more layers may include a respective veil, and the bonding together of the two or more layers may be caused by melting or activating the respective veils proximate the overlapped or abutted area.

According to yet another embodiment, a system for tacking together two or more layers of material includes an electrostatic tacking membrane assembly, a power module, a moving module and a control module. The electrostatic tacking membrane assembly includes a membrane made of an elastic material and having a plurality of electrostatic pads carried thereon, one or more tacking elements disposed on the membrane, and a plurality of first and second electrical leads disposed within or on the membrane and connected with the electrostatic pads and the one or more tacking elements, respectively. The power module is configured for supplying the electrical power to the electrostatic pads for generating an electrostatic potential thereacross and to selected ones of the tacking elements for heating up the selected tacking elements. The moving module is configured for moving and positioning the electrostatic tacking membrane assembly. The control module is operatively connected with the power module and the moving module, wherein the control module is configured to control the supplying of electrical power by the power module and the moving and positioning by the moving module.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figures 1, 2:
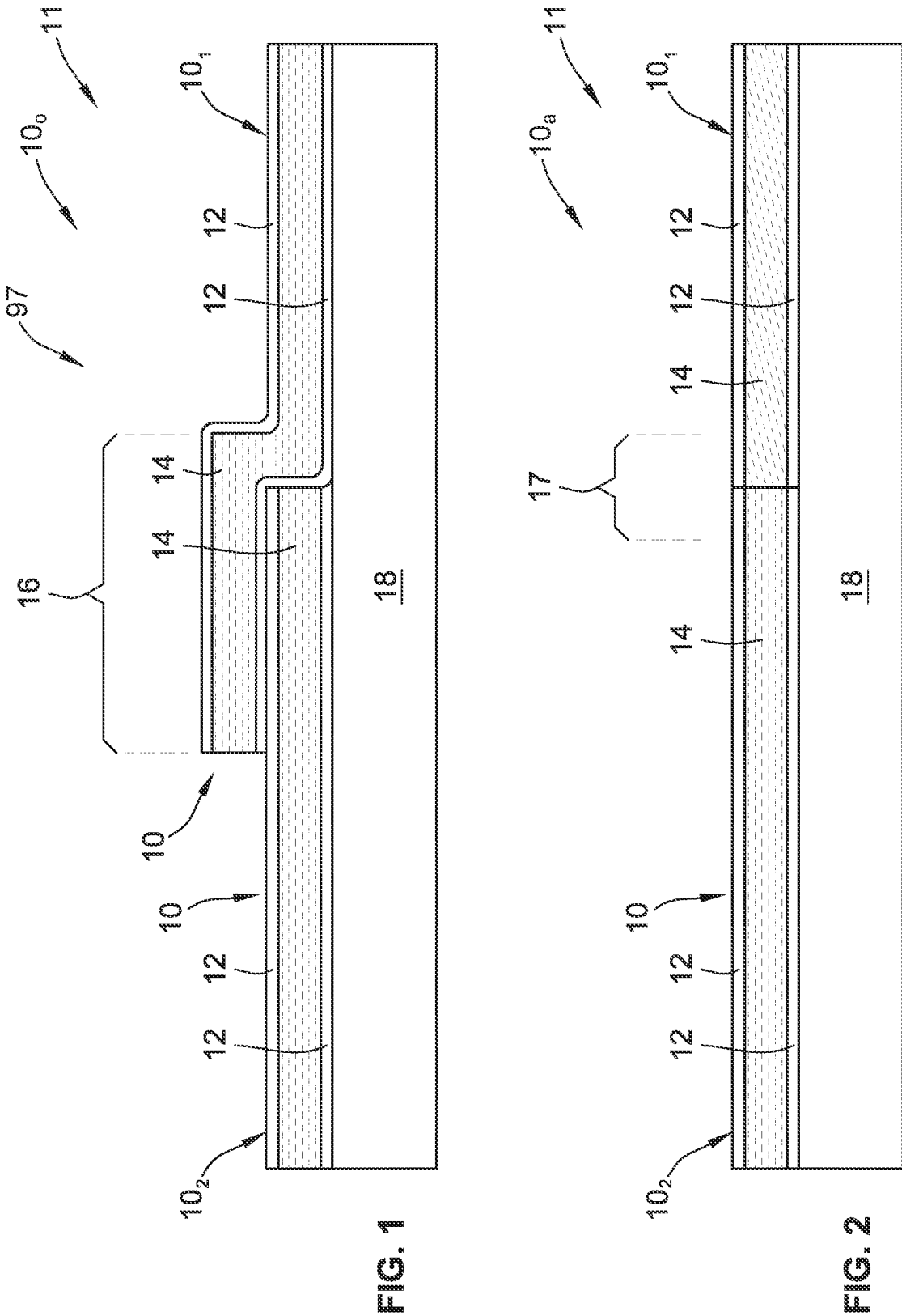
FIG. 1 is a schematic side view of two partially overlapped layers of dry carbon fiber fabric.
FIG. 2 is a schematic side view of two abutted layers of dry carbon fiber fabric.

Referring now to the drawings, wherein like numerals indicate like parts in the several views, an electrostatic tacking membrane assembly (ETMA) 20, and a method 100 and system 200 for tacking together two or more layers 10 of material 11, are shown and described herein.

FIGS. 1-2 show schematic side views of two layers 10 of material 11, where FIG. 1 shows two partially overlapped layers $10_o$ and FIG. 2 shows two abutted layers $10_a$. Each layer 10 has a respective fiber core 14 sandwiched between two respective veils 12, wherein the fiber cores 14 are made of various fibers or strands and the veils 12 are made of thermoplastic material $12_{tp}$ or thermoset material $12_{ts}$. More specifically, the layers 10 as shown in FIG. 1 include a first layer $10_1$ and a second layer $10_2$, where a portion of the first layer $10_1$ overlaps onto a portion of the second layer $10_2$, thereby forming an overlapped area 16, with the overlapped area 16 and first and second layers $10_1$, $10_2$ (i.e., two overlapped layers $10_o$) resting on a work area 18. Alternatively, instead of the first and second layers $10_1$, $10_2$ being overlapped, the first and second layers $10_1$, $10_2$ may abut each other as illustrated in FIG. 2, with an edge of the first layer $10_1$ abutted against an edge of the second layer $10_2$, thereby forming an abutted area 17 associated with the two abutted layers $10_a$. In either case, and according to a conventional approach, the first and second layers $10_1$, $10_2$ may be picked up and moved into position on the work area 18 by using one or more electrostatic pads, and the overlapped or abutted areas 16, 17 may be heated by a heated tool, such that the veils 12 of the first and second layers $10_1$, $10_2$ are at least partially melted in the overlapped or abutted area 16, 17 immediately around the heated tool and then allowed to cool, or such that the veils 12 of the first and second layers $10_1$, $10_2$ are at least partially activated (e.g., chemically and/or thermally) in the overlapped or abutted area 16, 17 immediately around the heated tool and then allowed to cure, thereby locally tacking and joining the first and second layers 10₁, 10₂ together thereat.

However, this approach can suffer from various drawbacks. For example, the conventional approach may utilize one tool to position the first and second layers 10₁, 10₂ and another tool to heat the overlapped or abutted areas 16, 17 of the first and second layers 10₁, 10₂. Additionally, the electrostatic pads that are used to attract and hold the first and second layers 10₁, 10₂ while they are being moved into position typically have a fixed orientation with respect to each other, so they work well when interfacing with objects that have flat surfaces—such as layers 10 or sheets that are picked up from a horizontally flat stack of sheets and are then moved and positioned onto a horizontally flat work area 18—but such pads do not work well for positioning layers 10 or sheets onto work areas 18 that are not horizontally flat, but which may instead have curved or irregular surfaces.

In contrast with the abovementioned conventional approach, the ETMA 20 of the present disclosure, and the disclosed method 100 and system 200 which utilize the ETMA 20, solve the abovementioned drawbacks and technical problems, by the technical effects of combining the moving and tacking functionalities together and providing a structure which allows the ETMA 20 to bend, flex and conform to non-flat surfaces, thereby providing significant benefits and technical advantages which are not taught or suggested by the foregoing conventional approaches. These benefits and technical advantages include expanded capabilities, and greater productivity and reliability, as compared to previous approaches.

Figure 3:
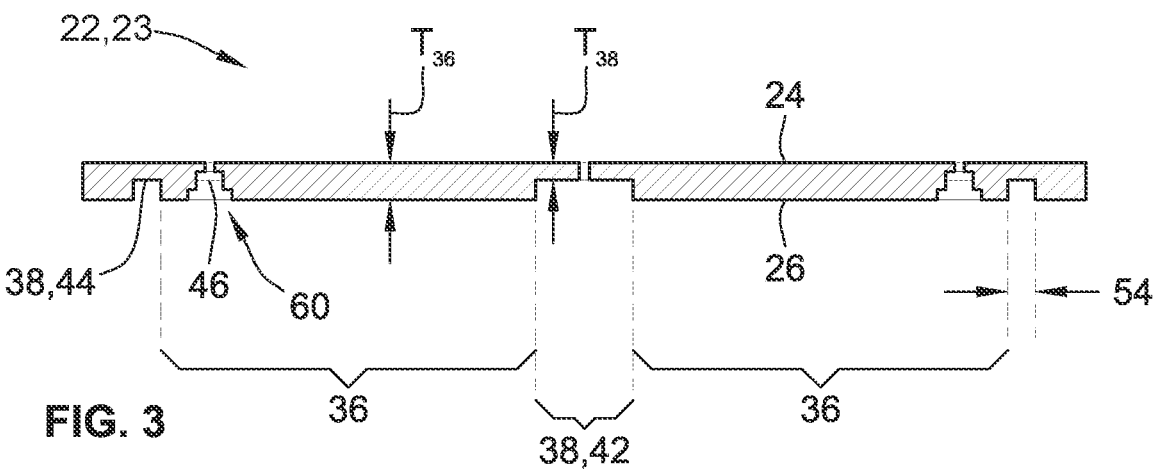
FIG. 3 is a schematic cross-sectional side view of a membrane according to the present disclosure.
Figure 4:
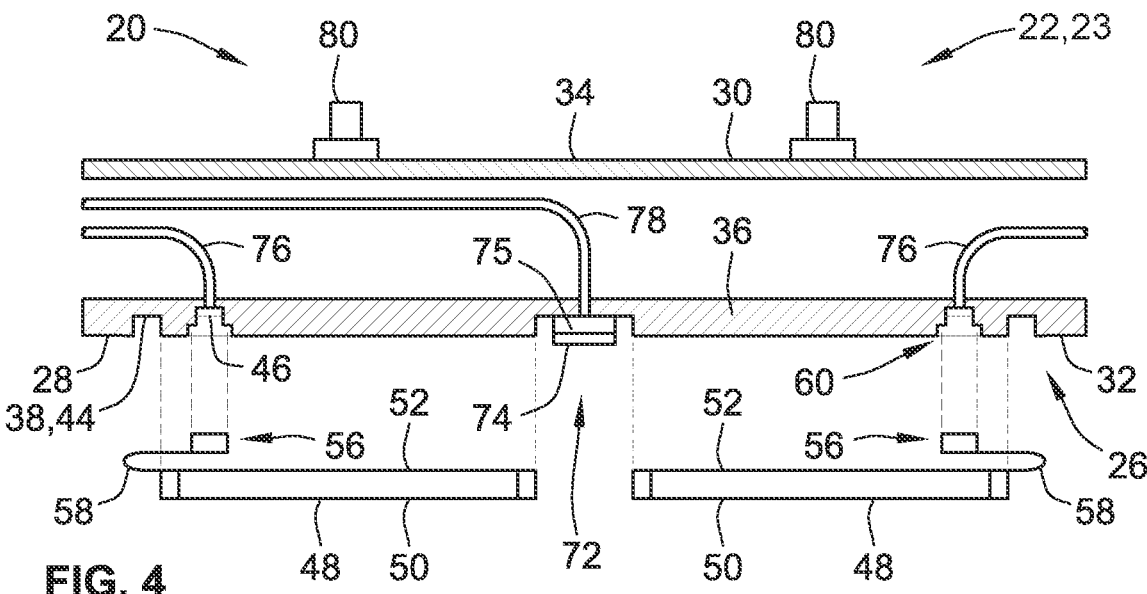
FIG. 4 is an exploded schematic cross-sectional side view of the membrane shown in FIG. 3 along with a second membrane and other elements in preparation for assembly.
Figure 5:
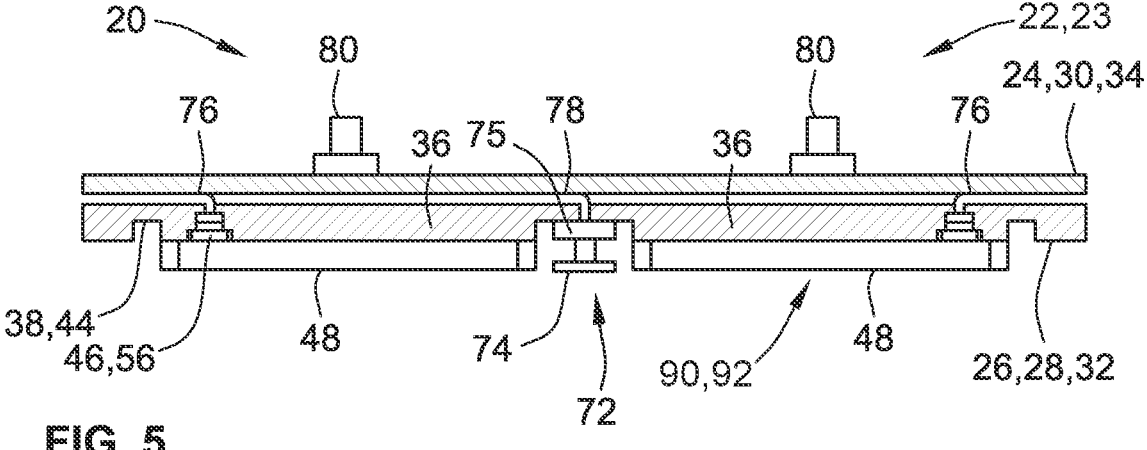
FIG. 5 is an assembled schematic cross-sectional side view of the elements shown in FIG. 4, forming an electrostatic tacking membrane assembly according to the present disclosure.

FIGS. 3-5 illustrate a series of steps for assembling an ETMA 20 according to the present disclosure. In FIG. 3, a schematic cross-sectional side view is shown of a membrane 22, and in FIG. 4, an exploded schematic cross-sectional side view is shown of the membrane 22 along with a second membrane 30 and other elements in preparation for assembly. Then, in FIG. 5, an assembled view of the elements is shown, thereby forming an ETMA 20. Relatedly, FIGS. 6-13 show various components of the ETMA 20, as well as particular configurations for the ETMA 20 itself.

The membrane 22 shown in FIGS. 3-5 and 6-7 is made of an elastic (i.e., flexible and stretchable) material 23 (e.g., an elastomer such as silicone rubber) and has opposed top and bottom sides 24, 26, with a plurality of thick and thin regions 36, 38 presented on the bottom side 26 of the membrane 22. The thick regions 36 have a given thickness $T_{36}$, and the thin regions 38 have a thickness $T_{38}$ that is thinner than that of the thick regions 36 (i.e., $T_{38} < T_{36}$). One or more recessed pockets 60 may be formed on the bottom side 26 of the membrane 22 within each of the thick regions 36, with a respective membrane electrical connector 46 embedded or captured within each recessed pocket 60. As described in greater detail below, the thin regions 38 include a network of hub regions 42 and spokes 44, with the spokes 44 separating and defining the thick regions 36, and with each of the spokes 44 having a width which represents a spacing 54 between thick regions 36 that are adjacent to each other.

Figure 6:
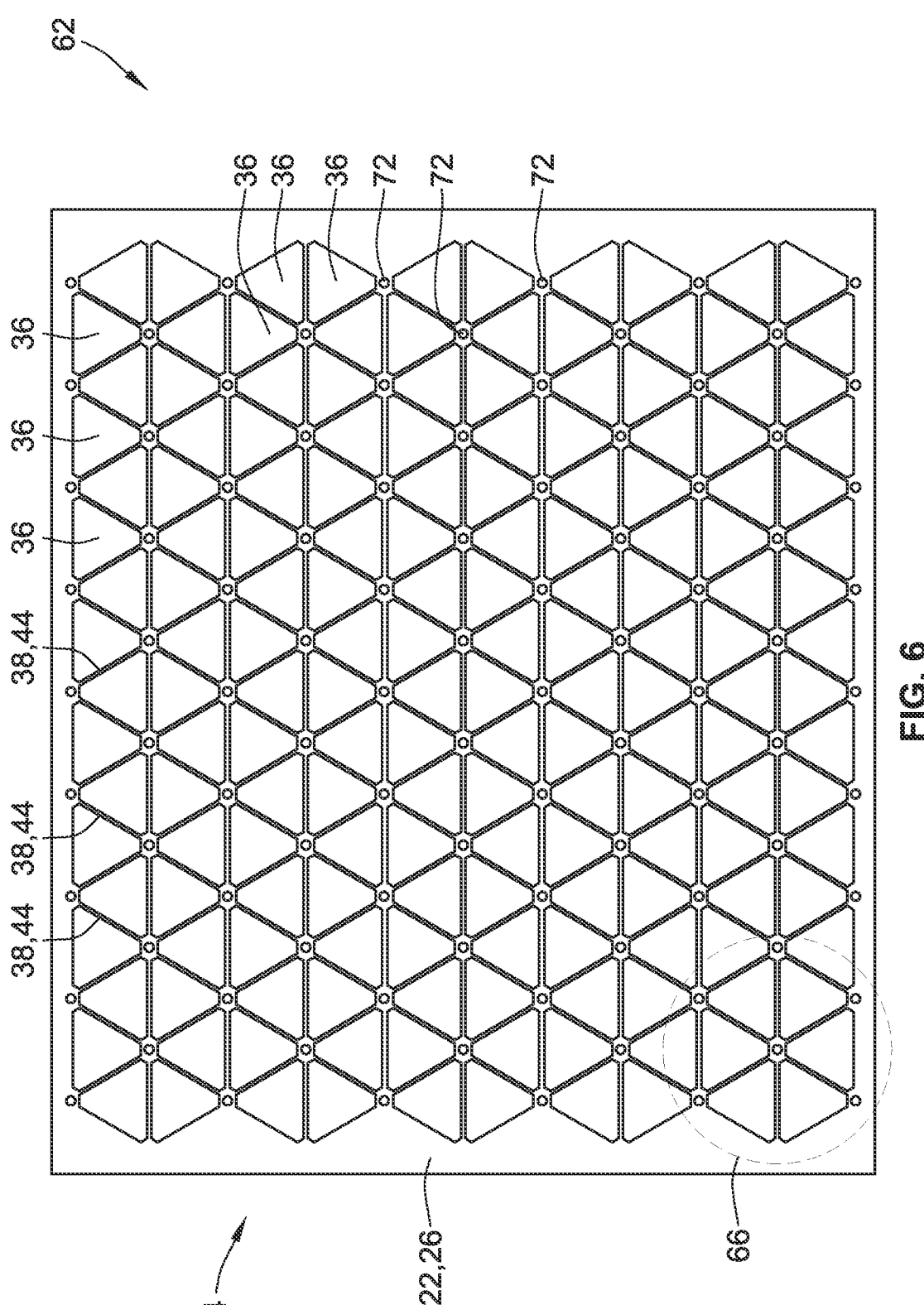
FIG. 6 is a schematic bottom plan view of a membrane having repeating hexagonal patterns of generally trunco-triangular thick regions.
Figure 10:
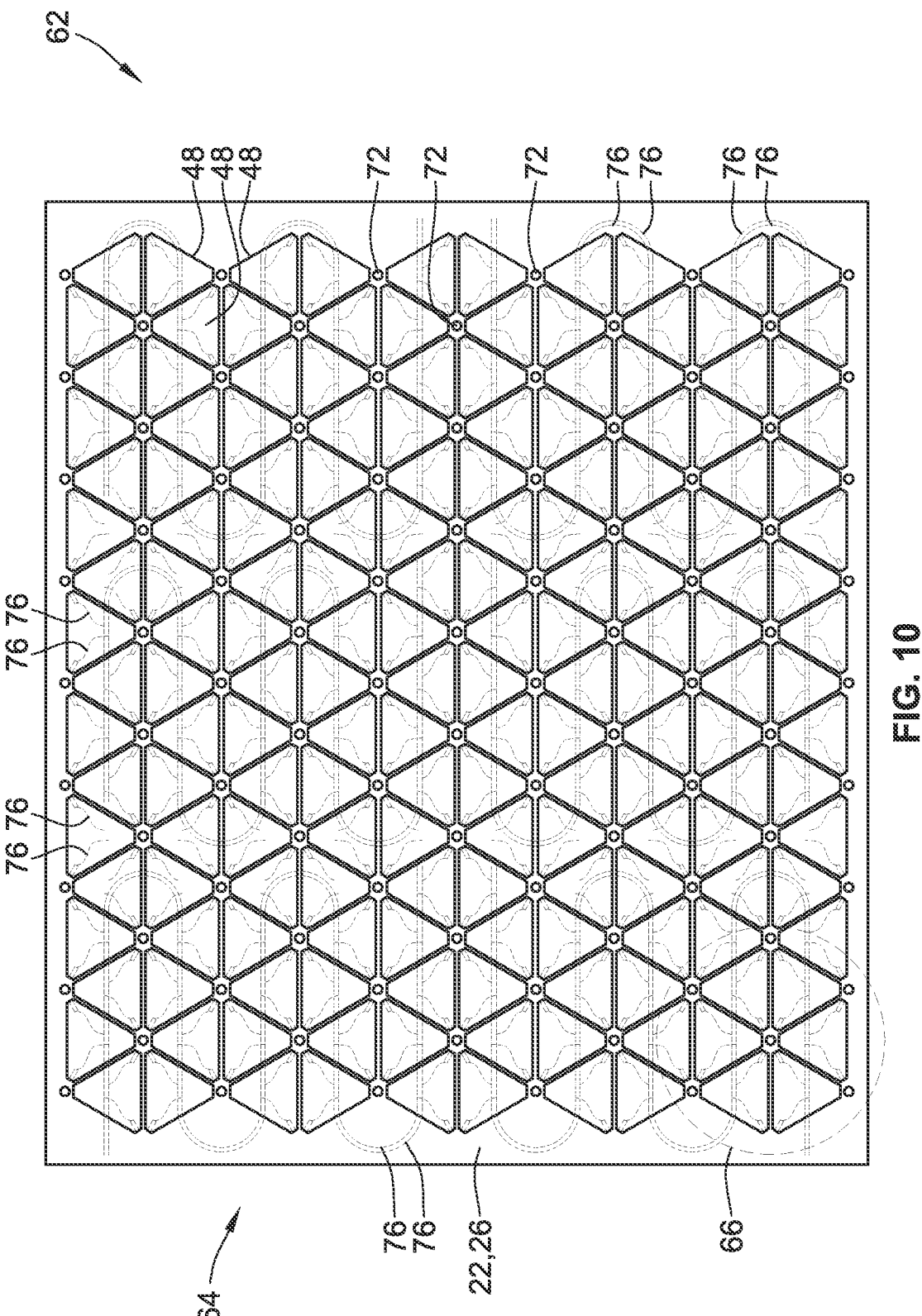
FIG. 10 is a schematic bottom plan view of an electrostatic tacking membrane assembly having generally trunco-triangular electrostatic pads.
Figure 13:
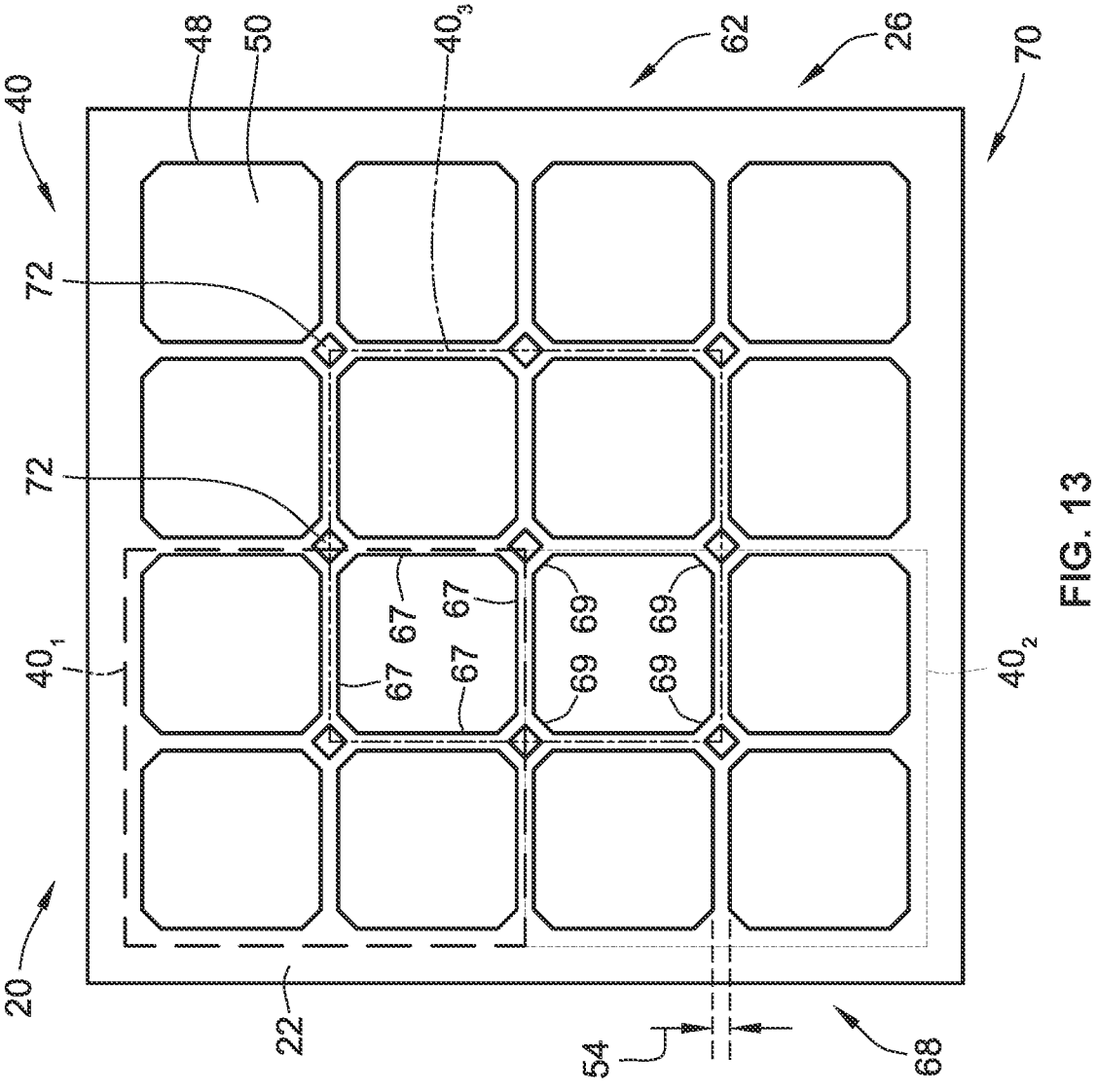
FIG. 13 is a schematic bottom plan view of an electrostatic tacking membrane assembly having generally trunco-rectangular electrostatic pads.

In FIG. 4, each of the membrane electrical connectors 46 has been attached to a respective first electrical lead 76 for supplying electrical power 94 to the connectors 46. A tacking element 72 is shown seated within a hub region 42 on the bottom side 26 of the membrane 22. Note that while only one tacking element 72 is shown in FIGS. 3-5, the membrane 22 may be populated with multiple tacking elements 72, as illustrated in FIGS. 6, 10 and 13. Each of the one or more tacking elements 72 is configured to be electrically heated; thus, the tacking element 72 has been attached to a second electrical lead 78 for supplying electrical power 94 to the tacking element 72. Note that the tacking element 72 may include a micro-heater 74 carried upon an extending member 75. The extending member 75 may take the form of a shape memory alloy lifter which assumes a retracted position when it is not electrically or thermally activated (as shown in FIG. 4) and which assumes an extended position when it is electrically or thermally activated (as shown in FIG. 5). For example, in the retracted position, the extending member 75 may dispose the micro-heater 74 closer to the bottom side 26 of the membrane 22, and in the extended position, the extending member 75 may dispose the micro-heater 74 outward and further away from the bottom side 26 of the membrane 22. Note that in some configurations, one second electrical lead 78 may supply electrical power 94 (and/or a command signal 96) to a tacking element 72 in order to actuate the extending member 75 to extend the micro-heater 74, while another second electrical lead 78 may supply electrical power 94 (and/or a command signal 96) to the tacking element 72 in order to heat up the micro-heater 74.

Optionally, the membrane 22 may comprise or be considered as a first membrane 28, with a second membrane 30 added thereto. Here, the second membrane 30 is disposed above the first membrane 28, and when they are sandwiched and connected together as shown in FIG. 5, the first and second membranes 28, 30 together may be viewed as "the" membrane 22. Thus, when the first and second membranes 28, 30 are used together, a bottom face 32 of the first membrane 28 may be considered as the bottom side 26 of the membrane 22, and a top face 34 of the second membrane 30 may be considered as the top side 24 of the membrane 22. In this arrangement, the first and second membranes 28, 30 may each be made of an elastic material 23, including the same material, and the plurality of thick and thin regions 36, 38 may be formed as part of the first membrane 28.

It may be noted that when the membrane 22 comprises a first membrane 28 and a second membrane 30, the first and second electrical leads 76, 78 may be disposed within the membrane 22 as depicted in FIG. 5 (i.e., running between the first and second membranes 28, 30), or the first and second electrical leads 76, 78 may be disposed on the top side 24 of the membrane 22 (i.e., on the top face 34 of the second membrane 30). Similarly, when the membrane 22 comprises only a single membrane 22 (i.e., without a second membrane 30 attached thereto), the first and second electrical leads 76, 78 may be disposed within the membrane 22 or on the top side 24 of the membrane 22. In either case, a plurality of inserts 80 may be embedded or attached on the top side 24 of the membrane 22. These inserts 80 may be threaded or otherwise configured for fastenable engagement with an end effector 98, such as a robotic end effector.

Returning now to FIG. 4, a respective electrostatic pad 48 is shown registered with each thick region 36 of the membrane 22. Each electrostatic pad 48 has opposed first and second sides 50, 52, with each electrostatic pad 48 having one or more pad electrical connectors 56 disposed on or adjacent the respective second side 52. Each of the one or more pad electrical connectors 56 may include a ribbon cable 58 extending from or adjacent the second side 52 of the electrostatic pad 48. These pad electrical connectors 56 are provided for supplying electrical power 94 to the first side 50 of the electrostatic pad 48 for generating an electrostatic potential 90 thereacross. As shown in FIGS. 4-5, each of the electrostatic pads 48 is disposed on a respective one of the thick regions 36 on the bottom side 26 of the membrane 22, with the second side 52 of the electrostatic pad 48 facing and attached to the bottom side 26 of the membrane 22, and with the one or more pad electrical connectors 56 in communication with the one or more membrane electrical connectors 46. As described in greater detail below, the electrostatic pads 48 may assume a variety of different shapes, and the thick regions 36 may be sized and shaped to match the size and shape of the electrostatic pads 48.

In FIG. 5, a schematic cross-sectional view is shown of a completed ETMA 20. Here, the drawing may be viewed in either of two ways. According to a first view, the membrane 22 began as a first membrane 28 and a second membrane 30 that have been sandwiched and connected together, and according to a second view, the membrane 22 began as a single piece. In the first view, the first and second electrical leads 76, 78 may either be sandwiched between the first and second membranes 28, 30 (as illustrated in FIGS. 4-5), or they may be disposed along the top side 24 of the assembled membrane 22 (i.e., along the top face 34 of the second membrane 30). In the second view, the first and second electrical leads 76, 78 may either be embedded within the membrane 22 (e.g., the first and second electrical leads 76, 78 may be placed in a mold and elastic material 23 may be injected into the mold around the first and second electrical leads 76, 78), or the first and second electrical leads 76, 78 may be disposed along the top side 24 of the assembled membrane 22.

FIG. 6 shows a bottom plan view of a membrane 22 in which each of the thick regions 36 has a generally trunco-triangular shape 64. Note that each thick region 36 has the overall appearance of a triangle whose three vertices have been truncated (hence the generally "trunco-triangular" shape 64). Here, the thick regions 36 are arranged in a repeating geometric pattern 62—namely, a hexagonal pattern 66.

Figure 7:
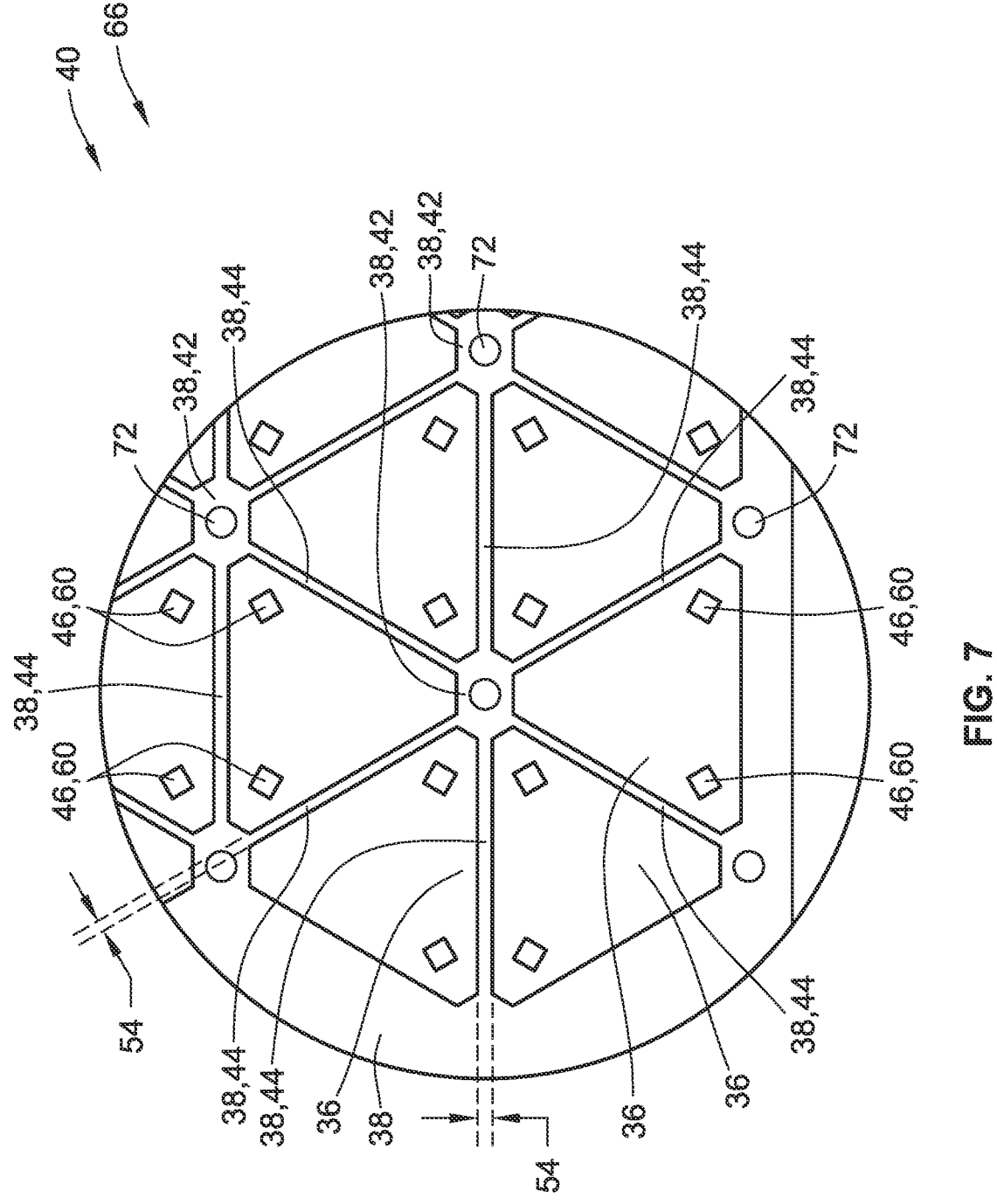
FIG. 7 is a close-up view of a selected hexagonal pattern from the dashed circle of FIG. 6.

Relatedly, FIG. 7 shows a close-up view of a selected hexagonal pattern 66 from the dashed circle of FIG. 6. As noted above, the thin regions 38 of the membrane 22 may be arranged in one or more hub-and-spoke patterns 40. Each hub-and-spoke pattern 40 includes a plurality of spokes 44 radiating from a hub region 42, and these hub-and-spoke patterns 40 may overlap and/or abut each other. Here in FIGS. 6-7, where the thick regions 36 have a generally trunco-triangular shape 64, the repeating geometric pattern 62 and the hub-and-spoke pattern 40 are each a hexagonal pattern 66; however, in other configurations where the thick regions 36 have a shape other than a generally trunco-triangular shape 64, the repeating geometric pattern 62 and hub-and-spoke pattern 40 may be something other than a hexagonal pattern 66. For example, in FIG. 13, the thick regions 36 (and the respective electrostatic pads 48 which are disposed thereon) have a generally trunco-rectangular shape 68, and the repeating geometric pattern 62 and hub-and-spoke pattern 40 assume a rectangular pattern 70. In any case, a tacking element 72 may be disposed and secured onto each of the hub regions 42.

Returning to FIG. 7, it may be seen that each thick region 36 is shown having two recessed pockets 60 with a membrane electrical connector 46 within each recessed pocket 60. (The relationship between the recessed pockets 60 and the membrane electrical connectors 46 may be seen in greater detail in the cross-sectional side views of FIGS. 3-5.) Note, however, that in some configurations, each thick region 36 may have only one recessed pocket 60 and one membrane electrical connector 46, or one recessed pocket 60 with two membrane electrical connectors 46 within the recessed pocket 60.

Figures 8, 9:
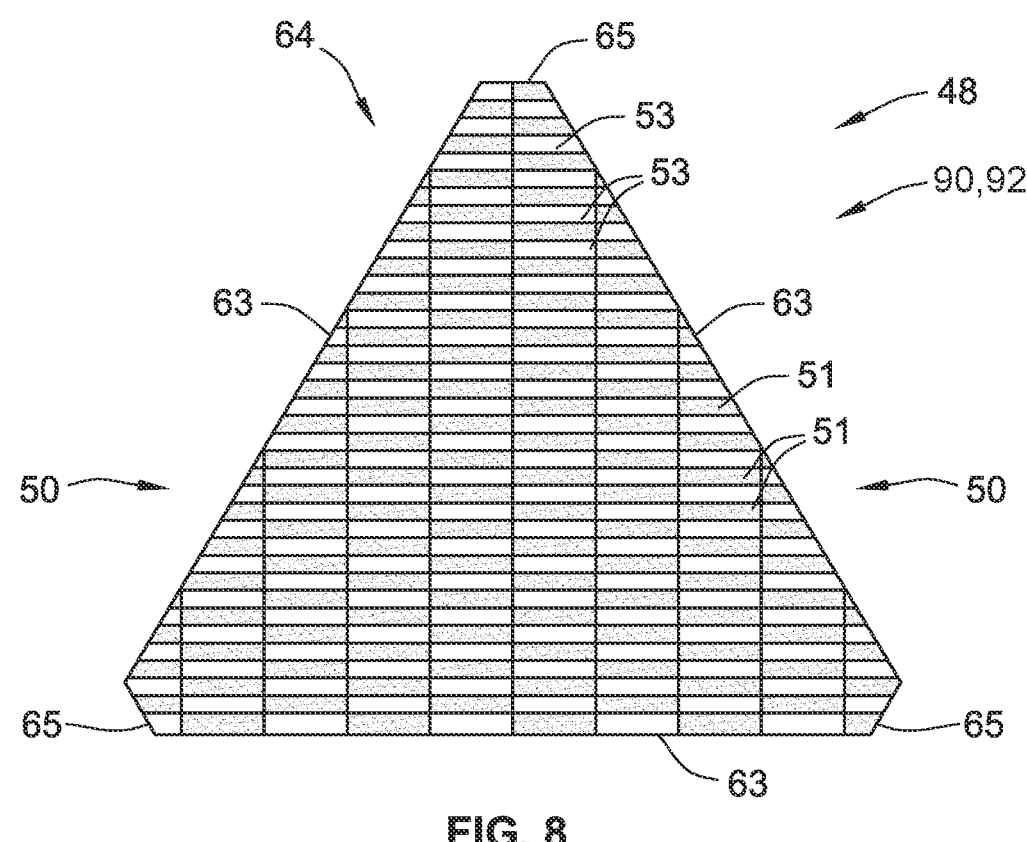
FIG. 8 is a bottom plan view of an electrostatic pad.
FIG. 9 is a top perspective view of the electrostatic pad of FIG. 8.

FIG. 8 shows a bottom plan view of an electrostatic pad 48 (i.e., looking up onto the first side 50), and FIG. 9 shows a top perspective view of an electrostatic pad 48 (i.e., looking down onto the second side 52). The electrostatic pads 48 shown here have a generally trunco-triangular shape 64, and, as noted above, the electrostatic pads 48 may be sized and shaped to match the size and shape of the thick regions 36 of the membrane 22. Note that the generally trunco-triangular shape 64 of the electrostatic pad 48 includes three long sides 63 and three short or "truncated" sides 65. The first side 50 of the electrostatic pad 48 includes an alternating array of positive electrodes 51 and negative electrodes 53, while the second side 52 includes two (or any other appropriate number) of pad electrical connectors 56 (each of which may optionally include a respective ribbon cable 58).

Figure 11:
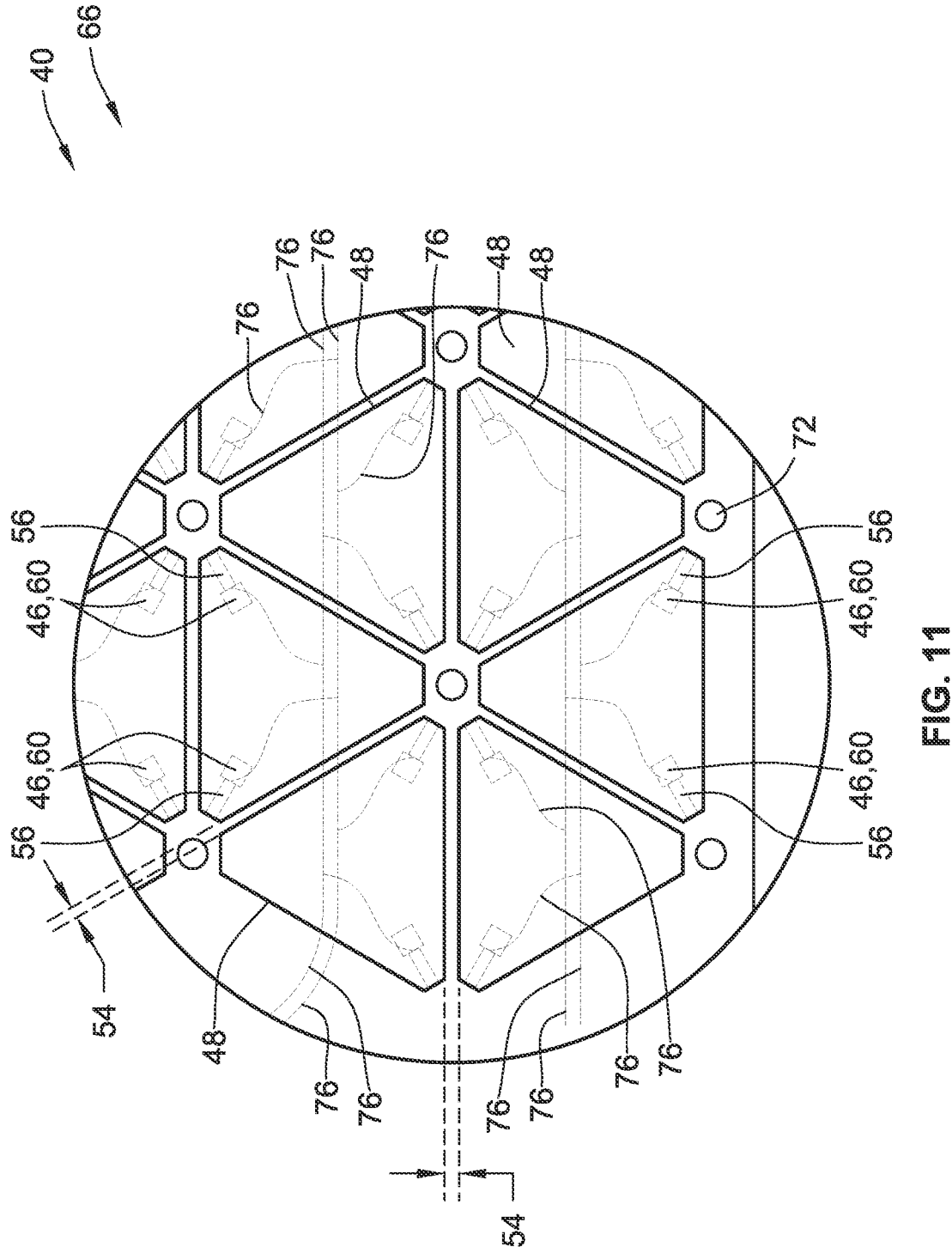
FIG. 11 is a close-up view of the electrostatic tacking membrane assembly from the dashed circle of FIG. 10.

FIG. 10 shows a schematic bottom plan view of a fully assembled ETMA 20, in which a plurality of electrostatic pads 48 that have a generally trunco-triangular shape 64 have been mounted onto a corresponding plurality of thick regions 36 that are also generally trunco-triangular. Here, the electrostatic pads 48 are arranged in a repeating geometric pattern 62 of hexagonal patterns 66 and hub-and-spoke patterns 40, with a hub-and-spoke pattern 40 (which is also a hexagonal pattern 66) being shown in a close-up view in FIG. 11. FIGS. 10-11 also show dashed lines representing the first electrical leads 76 which connect with the plurality of membrane electrical connectors 46. (It may be noted that although a completely assembled ETMA 20 includes one or more second electrical leads 78 as well, which are connected with the tacking elements 72, these second electrical leads 78 are not shown in FIGS. 10-11.) With the electrostatic pads 48 installed onto the bottom side 26 of the membrane 22 as shown, the pad electrical connectors 56 are plugged into or otherwise connected with corresponding membrane electrical connectors 46. Optionally, the electrostatic pads 48 may be spaced apart from each other by a spacing 54 of approximately 10 millimeters.

Figure 12:
FIG. 12 is an alternative schematic bottom plan view of an electrostatic tacking membrane assembly having generally trunco-triangular electrostatic pads, but with the tacking elements removed.

FIG. 12 shows an alternative schematic bottom plan view of an ETMA 20 having electrostatic pads 48 that have a generally trunco-triangular shape 64, but with the tacking elements 72 removed. Note that while FIGS. 10 and 12 both utilize a repeating geometric pattern 62 of individual hexagonal patterns 66 of electrostatic pads 48, FIG. 12 shows an alternative wiring layout for the first and second electrical leads 76, 78 as compared to the wiring layout illustrated in FIG. 10. The arrangement shown in FIG. 12 includes two first electrical leads 76 and three second electrical leads 78 connecting to each electrostatic pad 48. For example, one of the two first electrical leads 76 may supply power while the other supplies a ground; alternatively, one of the two first electrical leads 76 may supply a higher voltage while the other supplies a lower voltage (e.g., thus supplying a potential difference or voltage drop across each electrostatic pad 48). Regarding the three second electrical leads 78, these are routed to each hub region 42 for connection with a respective one or more tacking elements 72 (which are omitted in FIG. 12). In this arrangement, two of the three second electrical leads 78 may supply power to the one or more tacking elements 72 (e.g., one second electrical lead 78 for heating the micro-heater 74 and another second electrical lead 78 for actuating the extending member 75 for lifting/extending the micro-heater 74), and the remaining second electrical lead 78 may provide a common ground for the other two second electrical leads 78.

As introduced above, FIG. 13 shows a bottom view of an ETMA 20 in which the electrostatic pads 48 and the thick regions 36 (not shown, as they are behind the electrostatic pads 48) have a generally trunco-rectangular shape 68. Here, each generally trunco-rectangular shape 68 has four long sides 67 and four short sides 69, with the electrostatic pads 48 being arranged in a hub-and-spoke pattern 40 and a repeating geometric pattern 62 that are each a rectangular pattern 70. That is, a group of four electrostatic pads 48 which make up a single hub-and-spoke pattern 40 are arranged in a rectangular pattern 70, and these hub-and-spoke patterns 40 and rectangular patterns 70 repeat to form a repeating geometric pattern 62 (of repeating hub-and-spoke patterns 40 and rectangular patterns 70).

In FIG. 13, three of the repeating hub-and-spoke patterns 40 are highlighted with dashed lines. Specifically, a first hub-and-spoke pattern $40_1$ is shown in the upper-left of the drawing, a second hub-and-spoke pattern $40_2$ is shown in the lower-left of the drawing, and a third hub-and-spoke pattern $40_3$ is shown in the center of the drawing. Note that the first and second hub-and-spoke patterns $40_1$, $40_2$ are abutted with each other, while the third hub-and-spoke pattern $40_3$ overlaps each of the first and second hub-and-spoke patterns $40_1$, $40_2$.

Note that while the generally trunco-triangular shape 64 and the generally trunco-rectangular shape 68 are shown as having respective short sides 65, 69 that form obtuse-angled corners with their respective adjacent long sides 63, 67, these generally trunco-triangular shapes 64 and generally trunco-rectangular shapes 68 may also have short sides 65, 69 that are rounded, such that no abrupt corners of any kind are formed around the respective perimeter of each generally trunco-triangular shape 64 or each generally trunco-rectangular shape 68.

Figures 14, 15, 16, 17, 18, 19:
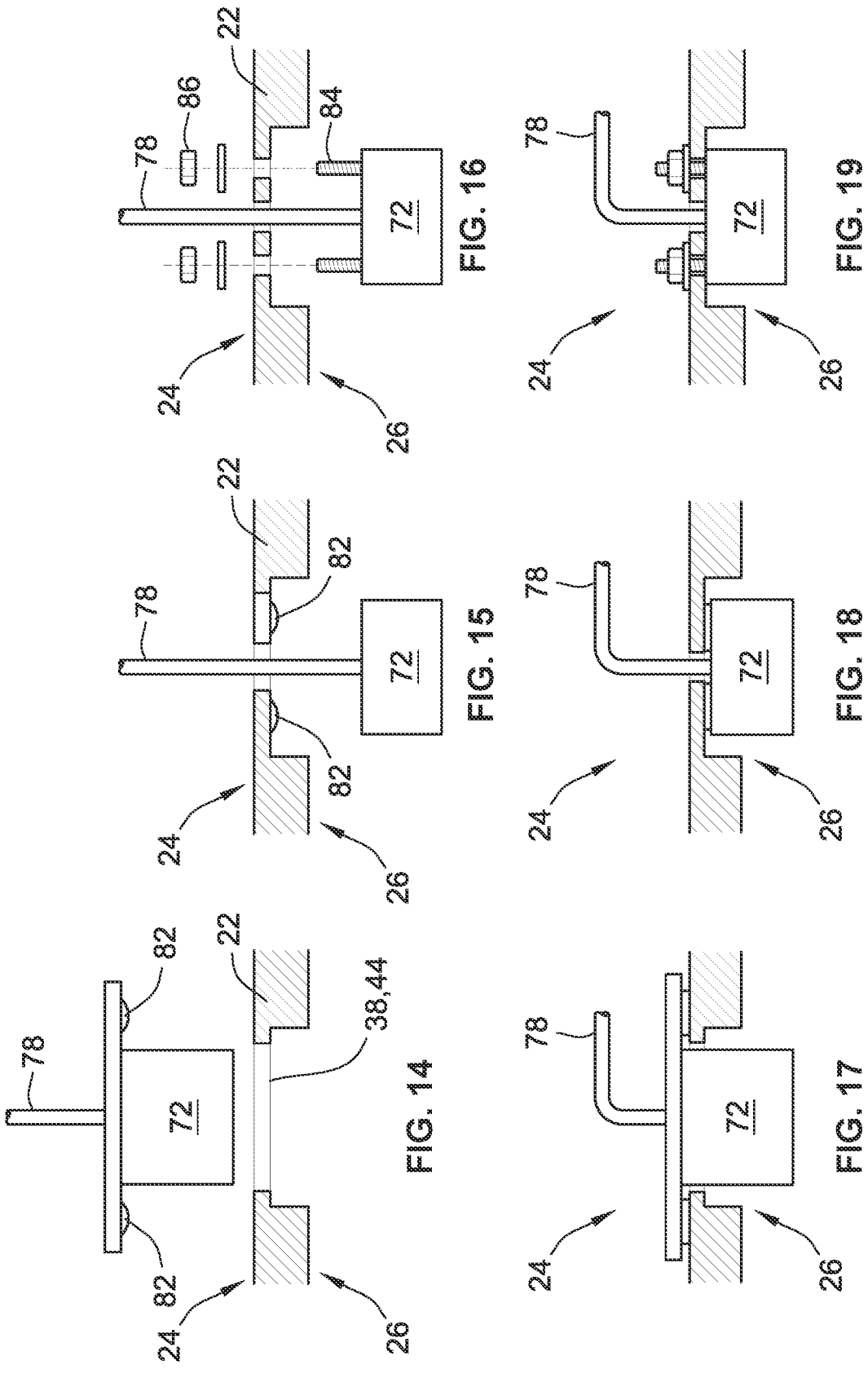
FIGS. 14-16 are schematic cross-sectional side views of three different approaches for attaching a tacking element to a hub region of the membrane before the tacking element is attached.
FIGS. 17-19 are schematic cross-sectional side views of the three approaches shown in FIGS. 14-16, respectively, after the tacking element has been attached to the membrane.

FIGS. 14-16 show schematic cross-sectional side views of three different approaches for attaching a tacking element 72 to a hub region 42 of the membrane 22 before the tacking element 72 is actually attached, and FIGS. 17-19 show respective views of these three approaches after the tacking element 72 has been attached to the membrane 22.

In FIG. 14, the tacking element 72 includes a flange that is wider than the width of the tacking element 72, with an adhesive 82 deposited onto an underside surface of the flange. The tacking element 72 is then lowered down from the top side 24 of the membrane 22 with the tacking element 72 itself being inserted through a hole formed in the hub region 42, until the adhesive 82 and flange contact the top side 24 of the membrane 22 as shown in FIG. 17. (Alternatively, the adhesive 82 may be deposited onto the top side 24 of the membrane 22 instead of or in addition to the adhesive 82 being deposited onto the underside of the flange.) Thus, in this arrangement, the tacking element 72 is attached to the membrane 22 on the top side 24 of the membrane 22.

In FIG. 15, an adhesive 82 is deposited into the hub region 42 on the bottom side 26 of the membrane 22, and the tacking element 72 is lifted up from the bottom side 26 of the membrane 22, until the top of the tacking element 72 contacts the adhesive 82 and the hub region 42 as shown in FIG. 18. (Alternatively, the adhesive 82 may be deposited onto the top surface of the tacking element 72 instead of or in addition to the adhesive 82 being deposited into the hub region 42.) Thus, in this arrangement, the tacking element 72 is attached to the membrane 22 on the bottom side 26 of the membrane 22.

In FIG. 16, the tacking element 72 has upward extending bolts 84, and the tacking element 72 is lifted up from the bottom side 26 of the membrane 22, with the bolts 84 being inserted through holes in the hub region 42 and fastened with nuts 86 on the top side 24 of the membrane 22 as shown in FIG. 19. (Alternatively, the tacking element 72 may have female threads and bolts 84 may be fed down into these threads from the top side 24 of the membrane 22, and/or the tacking element 72 may have one or more brackets, and bolts 84 and nuts 86 may be used to secure the one or more brackets to the hub region 42.) Thus, in this arrangement, the tacking element 72 is attached to the membrane 22 on both the top and bottom sides 24, 26 of the membrane 22, due to the clamping effect provided by the bolts 84 and nuts 86 acting together on both sides 24, 26 of the membrane 22.

With the ETMA 20 configured as described above with the one or more hub-and-spoke patterns 40 and the membrane 22 being made of an elastic material 23, the spokes 44 may serve to act as "living hinges" which permit the membrane 22 to be bendable along one or more of the spokes 44 at a time. This allows the ETMA 20 to be generally conformable with non-planar surfaces 97 (i.e., surfaces which are curved, irregularly shaped or otherwise non-flat).

Figure 20:
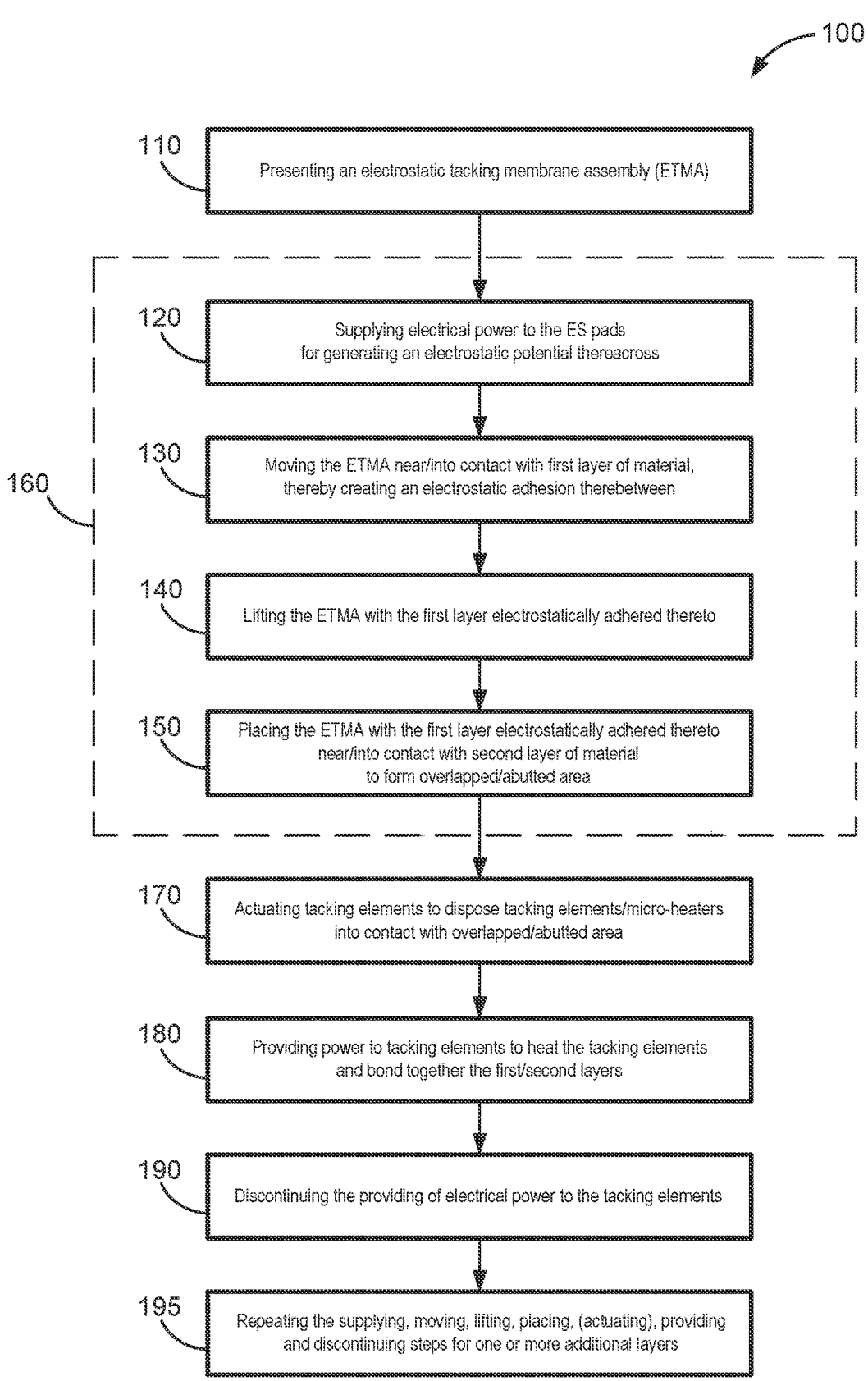
FIG. 20 is a flowchart for a method of tacking together two or more layers of material, utilizing the electrostatic tacking membrane assembly of the present disclosure.

FIG. 20 shows a flowchart for a method 100 of tacking together two or more layers 10 of material 11, utilizing the ETMA 20 of the present disclosure.

At block 110, the ETMA 20 is presented, where the ETMA 20 includes a membrane 22 made of an elastic material 23 and having a plurality of electrostatic pads 48 carried thereon, one or more tacking elements 72 disposed on the bottom side 26 of the membrane 22, and a plurality of first and second electrical leads 76, 78 disposed within or on the top side 24 of the membrane 22 and connected with the one or more membrane electrical connectors 46 and the one or more tacking elements 72, respectively.

At block 120, electrical power 94 is supplied to the first sides 50 of one or more of the electrostatic pads 48 for generating an electrostatic potential 90 thereacross. This electrical power 94 may be supplied to the first sides 50 of the electrostatic pads 48 by the first electrical leads 76, which may be connected with the membrane electrical connectors 46, which in turn may be connected with the pad electrical connectors 56. At block 130, the ETMA 20 is moved proximate or into contact with a first layer $10_1$ of the two or more layers 10 of material 11, thereby creating an electrostatic adhesion 92 between the electrostatic pads 48 and the first layer $10_1$. In the moving step of block 130, the respective first sides 50 of one or more of the electrostatic pads 48 may be placed proximate or in contact with the first layer $10_1$. Then, at block 140, the ETMA 20 is lifted with the first layer $10_1$ electrostatically adhered thereto.

The method 100 may also include: at block 150, placing the ETMA 20 with the first layer $10_1$ electrostatically adhered thereto proximate or into contact with a second layer $10_2$ of material 11, so as to provide an overlapped or abutted area 16, 17 of the first and second layers $10_1$, $10_2$. Alternatively, at block 160, the ETMA 20 may be positioned such that the one or more tacking elements 72 (or selected ones of the tacking elements 72) are positioned near or in contact with an overlapped or abutted area 16, 17 of two or more layers 10 of material 11 (which may be the first and second layers $10_1$, $10_2$). Note that block 160 is shown in FIG. 20 as a dashed rectangle encompassing blocks 120, 130, 140 and 150; this denotes that block 160 may include or comprise the steps of blocks 120-150.

Optionally, the method 100 may also include, at block 170, actuating one or more (e.g., selected ones) of the tacking elements 72 so as to dispose the tacking elements 72 into contact with the overlapped or abutted area 16, 17. For example, block 170 may be executed by causing the extending member 75 of the tacking elements 72 to actuate and thus to extend or lift the corresponding micro-heaters 74 outward from the bottom side 26 of the membrane 22.

At block 180, electrical power 94 is provided to the tacking elements 72 (e.g., selected ones of the tacking elements 72) that are proximate the overlapped or abutted area 16, 17 so as to electrically heat the tacking elements 72, thereby bonding together the two layers 10 of material 11 (e.g., the first and second layers $10_1$, $10_2$) proximate the overlapped or abutted area 16, 17 (e.g., in the area where the first and second layers $10_1$, $10_2$ abut or overlap each other).

The method 100 may further include: at block 190, discontinuing the providing of electrical power 94 to the one or more tacking elements 72; and, at block 195, repeating the supplying, moving, lifting, placing, providing and discontinuing steps of blocks 120-150 and 180-190 for one or more additional layers $10_+$ of material 11. (Optionally, the actuating step of block 170 may also be repeated as well or as needed as part of the repeating step of block 195. Note that the "actuating" step is shown in parentheses in block 195 to indicate that repetition of the actuating step is optional.) Each of the first and second layers $10_1$, $10_2$ of material 11 may include a respective veil 12, and the bonding together of the first and second layers $10_1$, $10_2$ at block 170 may be caused by locally melting or activating the respective veils 12 proximate the overlapped or abutted area 16, 17.

Figure 21:
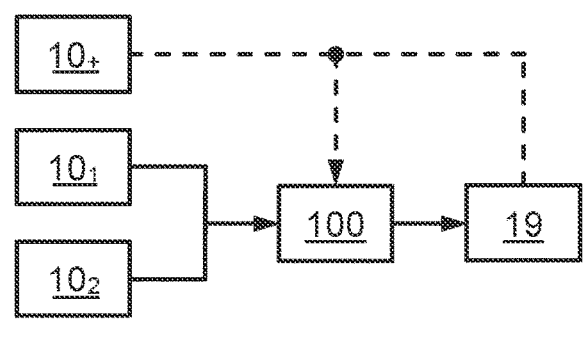
FIG. 21 is a block diagram for making a tacked assembly of two or more layers of material utilizing the method of FIG. 20.

FIG. 21 shows a block diagram for making a tacked assembly 19 of two or more layers 10 of material 11 utilizing the method 100 of FIG. 20. As shown in the diagram, a first layer $10_1$ and a second layer $10_2$ may be overlapped or abutted with each other to form a tacked assembly 19 by executing the method 100 as described above. Optionally, as indicated by the dashed lines of FIG. 21 and by block 195 of FIG. 20, an additional layer $10_+$ of material 11 may then be added to the tacked assembly 19 to form yet another tacked assembly 19 which incorporates the additional layer $10_+$.

Figure 22:
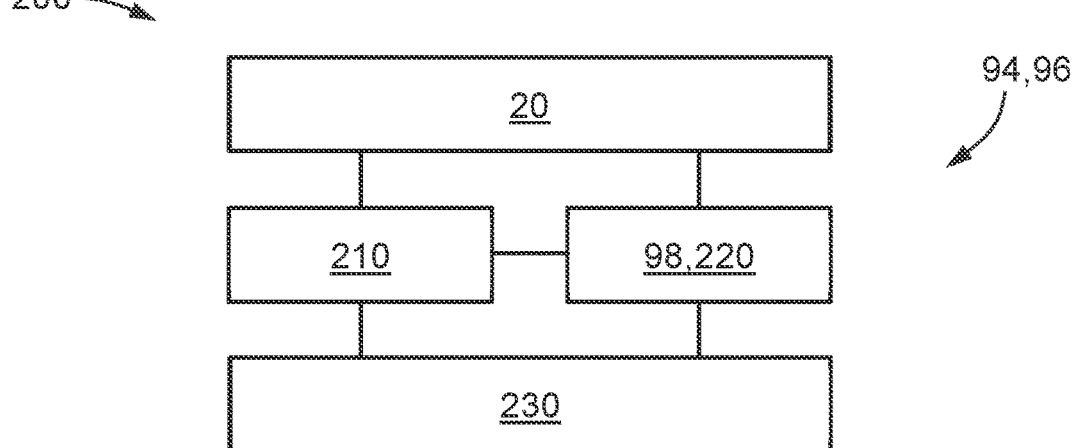
FIG. 22 is a block diagram of a system for tacking together two or more layers of material, utilizing the electrostatic tacking membrane assembly of the present disclosure.

FIG. 22 shows a block diagram of a system 200 for tacking together two or more layers 10 of material 11 according to the present disclosure. The system 200 includes an ETMA 20, a power module 210, a moving module 220 and a control module 230. The power module 210 is configured for supplying electrical power 94 to the first sides 50 of the electrostatic pads 48 for generating an electrostatic potential 90 thereacross and to selected ones of the tacking elements 72 for heating up the selected tacking elements 72. The moving module 220 is configured for moving and positioning the ETMA 20, and may include one or more end effectors 98 for engagement with the ETMA 20. The control module 230 is operatively connected with the power module 210 and the moving module 220, with the control module 230 being configured to control the supplying of electrical power 94 by the power module 210 and the moving and positioning by the moving module 220, such as by utilizing various control signals 96. For example, the control module 230 may contain or have access to a microprocessor configured to run control software for selectively directing electrical power 94 to selected ones (e.g., some or all) of the electrostatic pads 48 and also to selected ones of the tacking elements 72 (e.g., those tacking elements 72 which are proximate or in contact with the overlapped or abutted area 16, 17). Note that some or all of the functionality of the control module 230 may be included within and/or performed by the power module 210 and/or the moving module 220.

Figure 23:
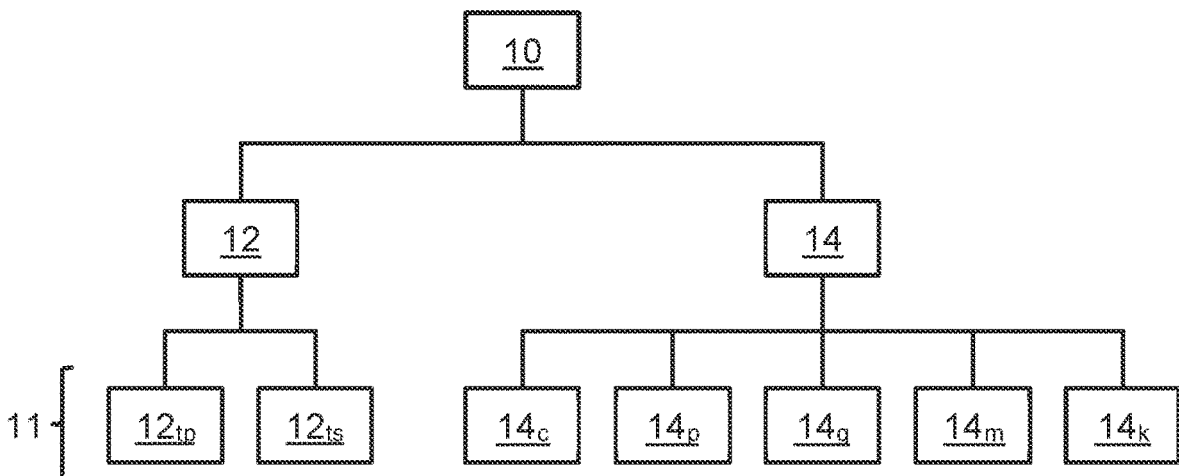
FIG. 23 is a block diagram of exemplary materials of which the two or more layers may be constructed.

FIG. 23 shows a block diagram of exemplary materials 11 of which the two or more layers 10 may be constructed. As shown here, and as further elucidated by FIGS. 1 and 2, a layer 10 may include a fiber core 14 covered by at least one veil 12, which together form the material 11 of which the layer 10 is made. The fiber core 14 may be made of a multiplicity of fibers or strands, which may be woven together (e.g., in the form of a cloth or textile) or which may take the form of a mat of chopped fiber or strands. The fibers or strands of the fiber core 14 may be made of one or more of carbon $14_c$ (e.g., carbon fiber), polymer $14_p$ (e.g., polyester, polyamide, polyethylene terephthalate, aramid, acrylic), glass $14_g$ (e.g., fiberglass), metal $14_m$ (e.g., stainless steel, nickel, aluminum, titanium, copper) and ceramic $14_k$ (e.g., silica, alumina, basalt). The veil 12 may be made of a thermoplastic material $12_{tp}$ (which may be melted by the application of heat and then allowed to return to solid form by cooling) or a thermoset material $12_{ts}$ (which may be chemically activated and cured by the application of heat).

In any of the foregoing embodiments, the hub-and-spoke pattern 40 may include a plurality of hub-and-spoke patterns 40 that are overlapped or abutted with each other, such as the first, second and third hub-and-spoke patterns $40_1$, $40_2$, $40_3$ of FIG. 13 mentioned above. Similarly, even a single hexagonal pattern 66, such as highlighted in FIGS. 7 and 11, or even a single rectangular pattern 70, such as any of the first, second and third hub-and-spoke patterns $40_1$, $40_2$, $40_3$ of FIG. 13, may be considered as a repeating geometric pattern 62 (i.e., a pattern of geometric shapes which "repeat" or appear at regular, repeating intervals). For example, a single hexagonal pattern 66 has six trunco-triangular shapes 64 (of the thick regions 36 and electrostatic pads 48) which repeat at 60 degree intervals about a hub region 42 that has a hexagonal shape, and each of the first, second and third hub-and-spoke patterns $40_1$, $40_2$, $40_3$ has a respective set of four trunco-rectangular shapes 68 which repeat at 90 degree intervals about a hub region 42 that has a rectangular shape.

As one having skill in the relevant art will appreciate, the electrostatic tacking membrane assembly 20, the method 100 and the system 200 of the present disclosure may be presented or arranged in a variety of different configurations and embodiments.

According to one embodiment, an ETMA 20 includes: (i) a membrane 22 made of an elastic material 23 and having opposed top and bottom sides 24, 26 with one or more membrane electrical connectors 46 disposed on the membrane 22; (ii) a plurality of electrostatic pads 48 each having respective opposed first and second sides 50, 52, wherein each of the electrostatic pads 48 includes one or more respective pad electrical connectors 56 disposed on or adjacent the respective second side 52 for supplying electrical power 94 to the respective first side 50; (iii) one or more tacking elements 72 disposed on the bottom side 26 of the membrane 22, wherein each of the one or more tacking elements 72 is configured to be electrically heated; and (iv) a plurality of first and second electrical leads 76, 78 disposed within or on the top side 24 of the membrane 22 and connected with the one or more membrane electrical connectors 46 and the one or more tacking elements 72, respectively.

The material 11 may have a fiber core 14 covered by at least one veil 12, wherein the fiber core 14 may be made of at least one of carbon $14_c$, polymer $14_p$, glass $14_g$, metal $14_m$ and ceramic $14_k$, and wherein the at least one veil 12 may be made of a thermoplastic material $12_{tp}$ or a thermoset material $12_{ts}$. Additionally, the electrostatic pads 48 may form a repeating geometric pattern 62 on the bottom side 26 of the membrane 22.

The membrane 22 may include a plurality of thick and thin regions 36, 38 presented on the bottom side 26 of the membrane 22, wherein the thin regions 38 are arranged in a hub-and-spoke pattern 40 of spokes 44 radiating from a hub region 42 thereby defining the thick regions 36. Each of the one or more membrane electrical connectors 46 may be disposed on or within a respective one of the thick regions 36. The supplying electrical power 94 to the respective first side 50 may be effective for generating an electrostatic potential 90 thereacross. Each of the electrostatic pads 48 may be disposed on a respective one of the thick regions 36 on the bottom side 26 of the membrane 22 with the respective second side 52 of the electrostatic pad 48 attached to the bottom side 26 of the membrane 22 and with the one or more respective pad electrical connectors 56 in communication with the one or more respective membrane electrical connectors 46.

In this embodiment, the electrostatic pads 48 may be spaced approximately 10 millimeters apart from each other, and each of the one or more pad electrical connectors 56 may include a respective ribbon cable 58 extending from or adjacent the respective second side 52 of the respective electrostatic pad 48. The membrane 22 may be bendable along one or more of the spokes 44 so as to make the ETMA 20 generally conformable with non-planar surfaces 97.

The electrostatic pads 48 may have a generally trunco-triangular shape 64, and the repeating geometric pattern 62 may include one or more overlapped or abutted hexagonal patterns 66. Alternatively, the electrostatic pads 48 may have a generally trunco-rectangular shape 68, and the repeating geometric pattern 62 may include one or more rectangular patterns 70 that are overlapped or abutted with each other. The hub-and-spoke pattern 40 may include a plurality of hub-and-spoke patterns 40 that are overlapped or abutted with each other.

The tacking elements 72 may be attached to the membrane 22 on one or both of the top and bottom sides 24, 26 of the membrane 22, and each of the one or more tacking elements 72 may include a respective micro-heater 74. Each of the one or more tacking elements 72 may further include a respective extending member 75 configured to extend the respective micro-heater 74 outward from the bottom side 26 of the membrane 22.

Each of the thick regions 36 may include one or more recessed pockets 60 formed therein on the bottom side 26 of the membrane 22, wherein each of the recessed pockets 60 is configured for receiving a respective one of the pad electrical connectors 56 therein.

The membrane 22 may include a first membrane 28 and a second membrane 30 sandwiched and connected together, wherein the bottom side 26 of the membrane 22 is a bottom face 32 of the first membrane 28 and the top side 24 of the membrane 22 is a top face 34 of the second membrane 30. In this arrangement, the plurality of thick and thin regions 36, 38 may be formed as part of the first membrane 28.

The ETMA 20 may further include a plurality of inserts 80 embedded or attached on the top side 24 of the membrane 22, wherein each of the inserts 80 is configured for fastenable engagement with an end effector 98. Optionally, some or all of the inserts 80 may be threaded.

According to another embodiment, a method 100 for tacking together two or more layers 10 of material 11 includes, at block 160, positioning an ETMA 20 having one or more tacking elements 72 carried thereon such that the one or more tacking elements 72 are positioned near or in contact with an overlapped or abutted area 16, 17 of the two or more layers 10, and, at block 180, providing electrical power 94 to the one or more tacking elements 72 so as to electrically heat the selected tacking elements 72, thereby bonding together the two or more layers 10 of material 11 proximate the overlapped or abutted area 16, 17.

The method 100 further includes, at block 120, supplying electrical power 94 to one or more electrostatic pads 48 carried on the ETMA 20 (thereby generating an electrostatic potential 90 across the one or more electrostatic pads 48); at block 130, moving the ETMA 20 proximate or into contact with a first layer $10_1$ of the two or more layers 10 of material 11, thereby creating an electrostatic adhesion 92 between the one or more electrostatic pads and the first layer; and, at block 140, lifting the ETMA 20 with the first layer $10_1$ electrostatically adhered thereto.

In the moving step of block 130, respective first sides 50 of the one or more electrostatic pads 48 may be placed proximate or in contact with the first layer $10_1$.

The method 100 may also include: at block 170, actuating the one or more tacking elements 72 so as to dispose the one or more tacking elements 72 into contact with the overlapped or abutted area 16, 17. The method 100 may further include: at block 190, discontinuing the providing of electrical power 94 to the one or more tacking elements 72; and, at block 195, repeating the supplying, moving, lifting, placing, providing and discontinuing steps for one or more additional layers $10_+$ of material 11. Each of the two or more layers 10 may include a respective veil 12, and the bonding together of the two or more layers 10 may be caused by melting or activating the respective veils 12 proximate the overlapped or abutted area 16, 17.

According to yet another embodiment, a system 200 for tacking together two or more layers 10 of material 11 includes an electrostatic tacking membrane assembly 20, a power module 210, a moving module 220 and a control module 230. The electrostatic tacking membrane assembly 20 includes a membrane 22 made of an elastic material 23 and having a plurality of electrostatic pads 48 carried thereon, one or more tacking elements 72 disposed on the membrane 22, and a plurality of first and second electrical leads 76, 78 disposed within or on the membrane 22 and connected with the electrostatic pads 48 and the one or more tacking elements 72, respectively. The power module 210 is configured for supplying the electrical power 94 to the electrostatic pads 48 for generating an electrostatic potential 90 thereacross and to selected ones of the tacking elements 72 for heating up the selected tacking elements 72. The moving module 220 is configured for moving and positioning the electrostatic tacking membrane assembly 20. The control module 230 is operatively connected with the power module 210 and the moving module 220, wherein the control module 230 is configured to control the supplying of electrical power 94 by the power module 210 and the moving and positioning by the moving module 220.

While various steps of the method 100 have been described as being separate blocks, and various functions of the system 200 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

(As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An electrostatic tacking membrane assembly, comprising:

a membrane made of an elastic material and having opposed top and bottom sides with one or more membrane electrical connectors disposed on the membrane;

a plurality of electrostatic pads each having respective opposed first and second sides, wherein each of the electrostatic pads includes one or more respective pad electrical connectors disposed on or adjacent the respective second side for supplying electrical power to the respective first side;

one or more tacking elements positioned between adjacent ones of the electrostatic pads disposed on the bottom side of the membrane, wherein each of the one or more tacking elements is configured to be electrically heated; and a plurality of first and second electrical leads disposed within or on the top side of the membrane and connected with the one or more membrane electrical connectors and the one or more tacking elements, respectively.

2. The electrostatic tacking membrane assembly of claim 1, wherein the material has a fiber core covered by at least one veil, wherein the fiber core is made of at least one of carbon, polymer, glass, metal and ceramic, and wherein the at least one veil is made of a thermoplastic material or a thermoset material.

3. The electrostatic tacking membrane assembly of claim 1, wherein the electrostatic pads form a repeating geometric pattern on the bottom side of the membrane.

4. The electrostatic tacking membrane assembly of claim 1, wherein the membrane includes a plurality of thick and thin regions presented on the bottom side of the membrane, wherein the thin regions are arranged in a hub-and-spoke pattern of spokes radiating from a hub region thereby defining the thick regions.

5. The electrostatic tacking membrane assembly of claim 4, wherein each of the one or more membrane electrical connectors is disposed on or within a respective one of the thick regions.

6. The electrostatic tacking membrane assembly of claim 4, wherein the supplying electrical power to the respective first side is effective for generating an electrostatic potential thereacross.

7. The electrostatic tacking membrane assembly of claim 4, wherein each of the electrostatic pads is disposed on a respective one of the thick regions on the bottom side of the membrane with the respective second side of the electrostatic pad attached to the bottom side of the membrane and with the one or more respective pad electrical connectors in communication with the one or more respective membrane electrical connectors.

8. The electrostatic tacking membrane assembly of claim 1, wherein the electrostatic pads are spaced approximately 10 millimeters apart from each other.

9. The electrostatic tacking membrane assembly of claim 1, wherein each of the one or more pad electrical connectors includes a respective ribbon cable extending from or adjacent the respective second side of the respective electrostatic pad.

10. The electrostatic tacking membrane assembly of claim 4, wherein the membrane is bendable along one or more of the spokes so as to make the electrostatic tacking membrane assembly generally conformable with non-planar surfaces.

11. The electrostatic tacking membrane assembly of claim 3, wherein the electrostatic pads have a generally truncotriangular shape, and the repeating geometric pattern includes one or more hexagonal patterns that are overlapped or abutted with each other.

12. The electrostatic tacking membrane assembly of claim 3, wherein the electrostatic pads have a generally truncorectangular shape, and the repeating geometric pattern includes one or more rectangular patterns that are overlapped or abutted with each other.

13. The electrostatic tacking membrane assembly of claim 4, wherein the membrane includes a first membrane and a second membrane sandwiched and connected together, wherein the bottom side of the membrane is a bottom face of the first membrane and the top side of the membrane is a top face of the second membrane.

14. The electrostatic tacking membrane assembly of claim 13, wherein the plurality of thick and thin regions are formed as part of the first membrane.

15. The electrostatic tacking membrane assembly of claim 1, further comprising:

a plurality of inserts embedded or attached on the top side of the membrane, wherein each of the inserts is configured for fastenable engagement with an end effector.

16. The electrostatic tacking membrane assembly of claim 15, wherein some or all of the inserts are threaded.

17. The electrostatic tacking membrane assembly of claim 4, wherein each of the thick regions includes one or more recessed pockets formed therein on the bottom side of the membrane, wherein each of the recessed pockets is configured for receiving a respective one of the pad electrical connectors therein.

18. The electrostatic tacking membrane assembly of claim 4, wherein the hub-and-spoke pattern includes a plurality of hub-and-spoke patterns that are overlapped or abutted with each other.

19. The electrostatic tacking membrane assembly of claim 1, wherein each of the one or more tacking elements includes a respective micro-heater.

20. The electrostatic tacking membrane assembly of claim 19, wherein each of the one or more tacking elements further includes a respective extending member configured to extend the respective micro-heater outward from the bottom side of the membrane.

21. A method of using the electrostatic tacking membrane assembly of claim 1, comprising:

supplying electrical power to the electrostatic tacking membrane assembly to activate at least one of the electrostatic pads or the one or more tacking elements.

22. A system comprising:

the electrostatic tacking membrane assembly of claim 1; and a power module configured to supply electrical power to the electrostatic pads to generate an electrostatic potential and to the one or more tacking elements to heat the tacking elements;

a moving module configured to move and position the electrostatic tacking membrane assembly; and a control module operatively connected with the power module and the moving module and configured to control operation of the power module and movement of the electrostatic tacking membrane assembly.

23. An electrostatic tacking membrane assembly, comprising:

a membrane made of an elastic material and having opposed top and bottom sides with one or more membrane electrical connectors disposed on the membrane;

a plurality of electrostatic pads each having respective opposed first and second sides, wherein each of the electrostatic pads includes one or more respective pad electrical connectors disposed on or adjacent the respective second side for supplying electrical power to the respective first side;

one or more tacking elements disposed on the bottom side of the membrane, wherein each of the one or more tacking elements is configured to be electrically heated;

a plurality of first and second electrical leads disposed within or on the top side of the membrane and connected with the one or more membrane electrical connectors and the one or more tacking elements, respectively; and at least one of:

(1) wherein the membrane includes a plurality of thick and thin regions presented on the bottom side of the membrane, wherein the thin regions are arranged in a hub-and-spoke pattern of spokes radiating from a hub region thereby defining the thick regions;

(2) wherein the electrostatic pads have a generally trunco-triangular shape, and the repeating geometric pattern includes one or more hexagonal patterns that are overlapped or abutted with each other;

(3) wherein the electrostatic pads have a generally trunco-rectangular shape, and the repeating geometric pattern includes one or more rectangular patterns that are overlapped or abutted with each other;

(4) further comprising a plurality of inserts embedded or attached on the top side of the membrane, wherein each of the inserts is configured for fastenable engagement with an end effector; or (5) wherein each of the one or more tacking elements includes a respective micro-heater, and wherein each of the one or more tacking elements further includes a respective extending member configured to extend the respective micro-heater outward from the bottom side of the membrane.

24. The electrostatic tacking membrane assembly of claim 23, wherein the membrane includes the plurality of thick and thin regions presented on the bottom side of the membrane, wherein the thin regions are arranged in the hub-and-spoke pattern of spokes radiating from the hub region thereby defining the thick regions.

25. The electrostatic tacking membrane assembly of claim 23, wherein the electrostatic pads have the generally trunco-triangular shape, and the repeating geometric pattern includes the one or more hexagonal patterns that are overlapped or abutted with each other.

26. The electrostatic tacking membrane assembly of claim 23, wherein the electrostatic pads have the generally trunco-rectangular shape, and the repeating geometric pattern includes the one or more rectangular patterns that are overlapped or abutted with each other.

27. The electrostatic tacking membrane assembly of claim 23, further comprising the plurality of inserts embedded or attached on the top side of the membrane, wherein each of the inserts is configured for fastenable engagement with the end effector.

28. The electrostatic tacking membrane assembly of claim 23, wherein each of the one or more tacking elements includes the respective micro-heater, and wherein each of the one or more tacking elements further includes the respective extending member configured to extend the respective micro-heater outward from the bottom side of the membrane.

29. A method of using the electrostatic tacking membrane assembly of claim 23, comprising:

supplying electrical power to the electrostatic tacking membrane assembly to activate at least one of the electrostatic pads or the one or more tacking elements.

30. A system comprising:

the electrostatic tacking membrane assembly of claim 23; and a power module configured to supply electrical power to the electrostatic pads to generate an electrostatic potential and to the one or more tacking elements to heat the tacking elements;

a moving module configured to move and position the electrostatic tacking membrane assembly; and a control module operatively connected with the power module and the moving module and configured to control operation of the power module and movement of the electrostatic tacking membrane assembly.

* * * * *